(12) United States Patent
Cleveland et al.

(10) Patent No.: US 7,773,111 B2
(45) Date of Patent: Aug. 10, 2010

(54) SYSTEM AND METHOD FOR PERCEIVED IMAGE PROCESSING IN A GAZE TRACKING SYSTEM

(75) Inventors: Dixon Cleveland, Annandale, VA (US); Arthur W. Joyce, III, Vienna, VA (US)

(73) Assignee: LC Technologies, Inc., Fairfax, VA (US)

( * ) Notice: Subject to any disclaimer, the term of this patent is extended or adjusted under 35 U.S.C. 154(b) by 461 days.

(21) Appl. No.: 11/375,041

(22) Filed: Mar. 15, 2006

(65) Prior Publication Data
US 2007/0040908 A1 Feb. 22, 2007

Related U.S. Application Data

(60) Provisional application No. 60/661,963, filed on Mar. 16, 2005.

(51) Int. Cl.
*H04N 7/18* (2006.01)
*G06K 9/00* (2006.01)
(52) U.S. Cl. ....................................... 348/135; 382/103
(58) Field of Classification Search ................. 348/78, 348/135, 169; 382/103, 181
See application file for complete search history.

(56) References Cited

U.S. PATENT DOCUMENTS

| | | | | | |
|---|---|---|---|---|---|
| 5,280,530 | A | * | 1/1994 | Trew et al. | 382/103 |
| 5,767,911 | A | * | 6/1998 | Boon | 375/240.12 |
| 5,912,980 | A | * | 6/1999 | Hunke | 382/103 |
| 6,313,864 | B1 | * | 11/2001 | Tabata et al. | 348/14.02 |

* cited by examiner

*Primary Examiner*—Gims S Philippe
(74) *Attorney, Agent, or Firm*—John R. Kasha; Kasha Law LLC

(57) ABSTRACT

An embodiment of the present invention provide a system for measuring and modifying at least one model parameter of an object of an image in order to distinguish the object from noise in the image includes a perceived image generator, an image-match function, and a parameter adjustment function. The perceived image generator produces a first perceived image of the object based on the at least one model parameter. The image-match function compares the first perceived image with a real image of the object. The parameter adjustment function adjusts the at least one model parameter so that the perceived image generator produces a second perceived image of the object that more closely matches the real image than the first perceived image.

20 Claims, 21 Drawing Sheets

1000

1100

Corneal Reflection → ← Pupil

1500

1700

SYSTEM AND METHOD FOR PERCEIVED IMAGE PROCESSING IN A GAZE TRACKING SYSTEM

This application claims the benefit of U.S. Provisional Application No. 60/661,963, filed Mar. 16, 2005, which is herein incorporated by reference in its entirety.

This invention was made with Government support under contract no. DAAE30-02-C-1065 awarded by the U.S. Army TACOM-ARDEC. The Government has certain rights in the invention.

BACKGROUND

1. Field of the Invention

Embodiments of the present invention relate to systems and methods for improving pattern recognition in image processing systems. More particularly, embodiments of the present invention relate to systems and methods for measuring object features or parameters from noisy images of real objects using image processing systems.

2. Background of the Invention

Pattern recognition attempts to extract information from an image. Typically the image is processed looking for small features (sometimes referred to as low-level image processing) and then these features are fitted to a model of the pattern that the system is attempting to recognize. This only works well when the image is well focused and free of extraneous features, commonly lumped under the catchall category of noise.

In view of the foregoing, it can be appreciated that a substantial need exists for systems and methods that can advantageously determine low-level image features from an image containing noisy or extraneous features.

BRIEF SUMMARY OF THE INVENTION

One embodiment of the present invention is a system for measuring and modifying at least one parameter of an object of an image in order to distinguish the object from noise in the image. This system includes a perceived image generator, an image-match function, and a parameter adjustment function. The perceived image generator produces a first perceived image of the object based on the at least one model parameter. The image-match function compares the first perceived image with a real image of the object. The parameter adjustment function adjusts the at least one model parameter so that the perceived image generator produces a second perceived image of the object that more closely matches the real image than the first perceived image.

Another embodiment of the present invention is a method for measuring and modifying at least one parameter of an object of an image in order to distinguish the object from noise in the image. A first perceived image of the object is produced based on the at least one model parameter. The first perceived image is compared with a real image of the object. The at least one model parameter is adjusted so that the perceived image generator produces a second perceived image of the object that more closely matches the real image than the first perceived image.

DETAILED DESCRIPTION OF THE INVENTION

Figure 1:
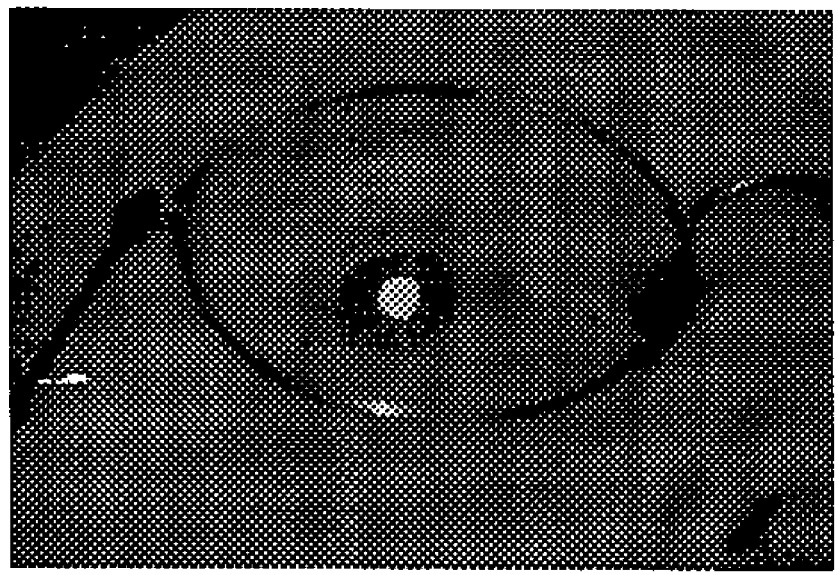
FIG. 1 is an exemplary clean, noise and clutter free image showing unobscured contours of the iris, pupil, and corneal reflection of an eye as typically seen in a gaze tracking system, in accordance with an embodiment of the present invention.
Figure 1:
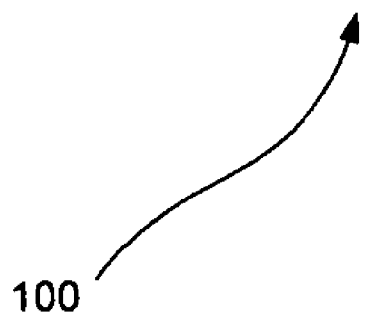

An embodiment of the present invention improves the robustness of pattern recognition and further can improve the robustness and accuracy of the parameter extraction.

An embodiment of the present invention allows significantly more complex image generation models to be use in pattern recognition.

An embodiment of the present invention extends the capabilities of gaze tracking systems such that the systems are no longer limited by interference from glasses, ambient light sources, etc.

Before one or more embodiments of the invention are described in detail, one skilled in the art will appreciate that the invention is not limited in its application to the details of construction, the arrangements of components, and the arrangement of steps set forth in the following detailed description or illustrated in the drawings. The invention is capable of other embodiments and of being practiced or being carried out in various ways. Also, it is to be understood that the phraseology and terminology used herein is for the purpose of description and should not be regarded as limiting.

One embodiment of the present invention is referred to as Perceived Image Processing (PIP). Its algorithm exploits a priori knowledge of what an idealized, noise-free image of an object should look like. With this knowledge, PIP recognizes which portions of the original image intensity profile constitute the object of interest and which portions represent noise. This knowledge represents a global, holistic framework to interpret the image. It can also model noise and therefore overcome many of the limitation of classical pattern recognition.

The term perceived image processing comes from the concept that the system's interpretation of the real image is its "perception" of the image. An exemplary PIP system contains a parametric model of what the image is a picture of. It produces a synthetic image, the perceived image, which is basically a graphical rendering of that perception using any or all of the commonly known rendering techniques, for instance geometric rendering, Phong shading, ray tracing, etc. The perceived image is then subtracted from the real image, which results in an error image. The error image contains the features and/or noise that the perceived parameters do not explain, as well as any errors in the parametric model. The system adjusts its parameters iteratively, using the error image to adjust (correct) the perceived parameters. A new perceived image is generated and a subsequent error image produced. The process iterates until one error image is substantially similar to the previous error image (i.e., the error has been minimized), or some acceptable error threshold has been reached. The output of the system is the parameter set that produced the final perceived image.

Another embodiment of the present invention is the use of a PIP system in a video gaze tracking system. This application and embodiment are only one application and are not intended to limit the applications of the invention in any way.

It has long been known that the angular orientation of the optical axis of the eye can be measured remotely by the corneal reflection method. The method takes advantage of the eye's properties that the cornea is approximately spherical over about a 35 to 45 degree cone around the eye's optic axis, and the relative locations of the pupil and a reflection of light from the cornea change in proportion to eye rotation. The corneal reflection method for determining the orientation of the eye is described in U.S. Pat. No. 3,864,030, for example, which is incorporated by reference herein.

Generally, systems used to measure angular orientation of the optical axis of the eye by the corneal reflection method include a camera to observe the eye, a light source to illuminate the eye, and a processor to perform image processing and mathematical computations. An exemplary system employing the corneal reflection method is described in U.S. Pat. No. 5,231,674, which is incorporated by reference herein. A system employing the corneal reflection method is often referred to as a gaze tracking system.

Classical pattern recognition performs feature extraction, and then model matching. The feature extraction is typically a low level image processing step, for instance edge extraction. This simplifies the process of matching the image to the model. (Model matching is often referred to as high-level processing.) For instance the Hough transform might be applied to extract the line segments from edges, and then the line segments can be fit to a model, perhaps a box or a chair.

The problem is that the quality of the results depends strongly on the quality of the low-level feature extraction. If the image has noise, blur or clutter (completely unrelated features in the image), then the feature extraction produces feature points that are not related to the problem at hand and/or fails to produce the feature points that are required to understand the image. Without sufficiently correct low level processing, the higher level processing fails.

Classical pattern recognition can adjust the low level processing to account for blur. However, edge extraction is a noise amplifier, so the system would have to iteratively adjust the edge detection parameters in order to get a signal to noise ratio that the higher level processing could handle. For instance, given the image in FIG. 2, the reflection would simply produce clutter in the edge-extracted image that would probably cause the high level processing to fail.

Figure 2:
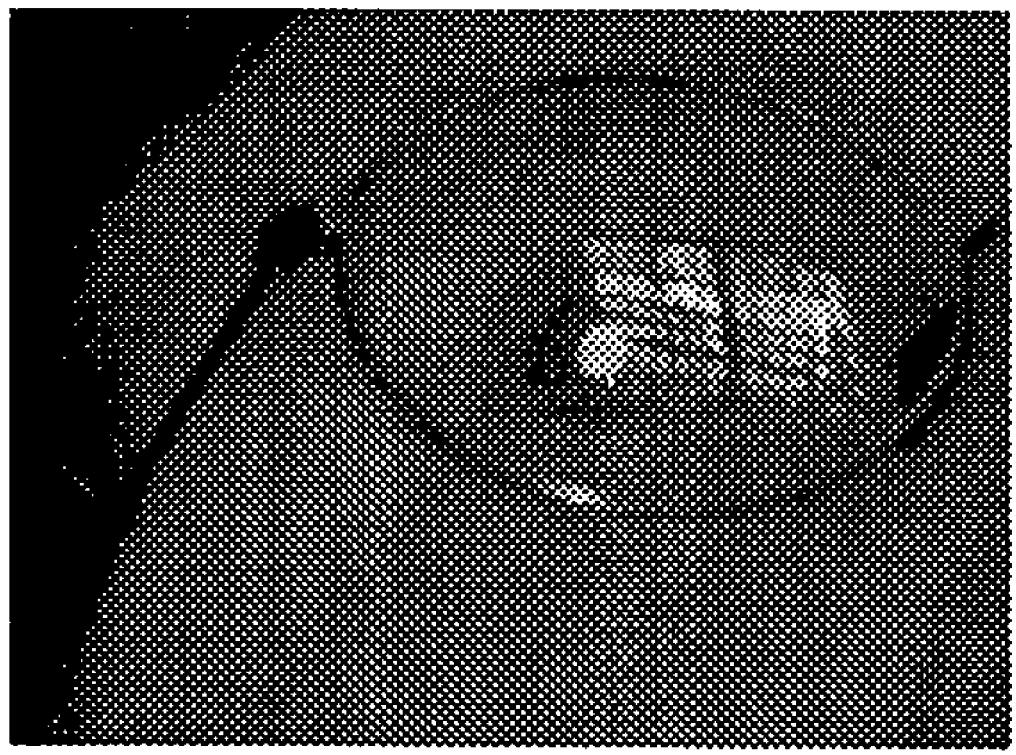
FIG. 2 is an exemplary noisy image showing contours of the pupil and corneal reflection of an eye obscured by a reflection of a window off of a user's glasses as typically seen in a gaze tracking system, in accordance with an embodiment of the present invention.
Figure 2:
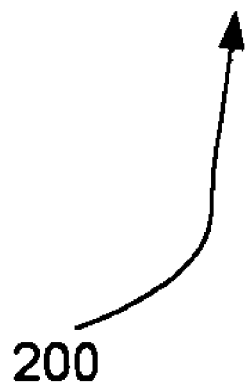

It is straightforward to model blur and clutter and add them to the model of the perceived image. Blur is created in the perceived image by convolving the focused rendering with a blur operator. The perceived model produces error images with more or less-blur and using an error minimization method, such as regression, actually measure the blur. Similarly, the clutter in the image can be modeled as an overlay of undesired features (see FIG. 2, showing an unwanted reflection in the glasses) and add that overlay to the perceived image. In FIG. 2, the unwanted reflection would be modeled as an overlay that slowly moves and warps slightly, but is a fixed pattern that is highly correlated to the pattern seen in prior video images.

The more complex the environment, the more using perceived image processing differentiates itself from the classical model. For instance in the case of gaze tracking, users often wear glasses. A simple lens is not a problem, as the image seen through the glasses is not warped substantially from one frame to the next. However, standard bifocal lenses produce a discontinuity that is difficult to handle. The classical model-matching algorithm would have to be able to find a disconnected circle. Using a Hough transform, the complexity of the problem would go from Order $N^2$ to Order $N^4$. The PIP model remains linear with the number of rendered pixels. Standard ray trace techniques can produce a perceived image with this discontinuity and continue to measure the parameters of the image.

In video gaze tracking systems, significant sources of clutter in the eye images include reflections of ambient light sources off the corneal surface of the eye or off a user's glasses. Even with techniques such as narrow spectral bandpass filters and pulsed illumination and shutter, ambient IR sources such as incandescent lamps and the sun can still superimpose significant clutter on the eye images. These clutter reflections are superimposed on top of the "clean" image of the eye generated by the gaze trackers illumination source.

FIG. 1 is an exemplary clean, noise and clutter free image 100 showing unobscured contours of the iris, pupil, and corneal reflection of an eye as typically seen in a gaze tracking system, in accordance with an embodiment of the present invention.

FIG. 2 is an exemplary noisy image 200 showing contours of the pupil and corneal reflection of an eye obscured by a reflection of a window off of a user's glasses as typically seen in a gaze tracking system, in accordance with an embodiment of the present invention.

An embodiment of the present invention requires that human beings, based on their innate knowledge of what objects 'ought' to look like, can easily separate the important features from the noise. In FIG. 2 for example, they are able to distinguish the upper right edge contour of the pupil, despite the window reflection superimposed on it. Because they expect the circular pupil shape, humans recognize that shape embedded in the window clutter and are able to identify the pupil shape and location correctly. By comparison, a simple edge detection algorithm becomes inadequate in the presence of significant clutter. The simple edge detector does not know which edges are relevant to the pupil, and does not detect low-amplitude pupil edges embedded within large image-noise intensity gradients.

Figure 3:
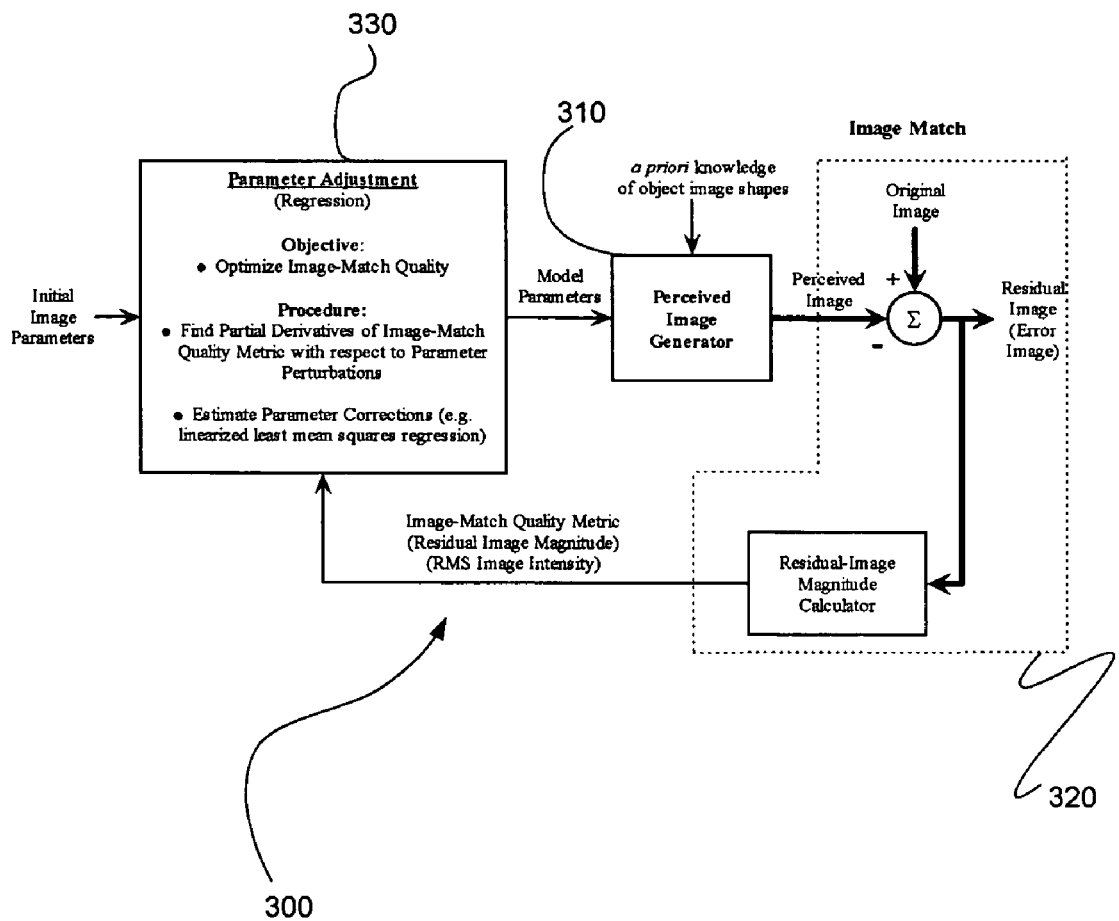
FIG. 3 is a schematic diagram of a perceived image processing system, in accordance with an embodiment of the present invention.

FIG. 3 is a schematic diagram of a perceived image processing system 300, in accordance with an embodiment of the present invention. System 300 includes perceived image generator 310, image-match function 320, and parameter adjustment function 330. First, perceived image generator 310 produces a "perceived image" of the object or objects in the real image based on a set of model parameters. Secondly, image-match function 320 computes how well the perceived image matches the original image. Finally, parameter adjustment function 330 adjusts the parameter values to improve the match between the perceived and original images. The result is that the final values of the model parameters represent optimum parameter estimates from the original image.

Perceived image generator 310 renders a "perceived image" of the object or objects being viewed. In a preferred embodiment, perceived image generator 310 generates the image of the expected scene based on a model defined from a priori knowledge of the physical and optical properties of the real object or objects. Also, a set of adjustable parameters is defined to represent the variable features of the scene as viewed by the camera. The adjustable parameters may include, but are not limited to, size, location, orientation, brightness, color, and focus condition.

Perceived image generator 310 provides accurate operation of a PIP system. For the PIP system to produce accurate parameter measurements, perceived image generator 310 is capable of producing synthetic images that accurately mimic the full range of images that would be expected to occur in reality, including variations in object size, location, orientation and lighting. The PIP's optimized parameter values can then be taken as good estimates of the true parameter values.

In any given PIP application, the specific design of perceived image generator 310 can be dependent on the particular object or objects whose parameters are being measured. An example design of perceived image generator 310 for use in an eye tracking application is presented later.

Image-match function 320 compares a perceived image to the real, original image to form an "image match" quality metric. The image match metric is a numerical value that represents how well the perceived image matches the original image. In a preferred embodiment, an image match metric is computed by a two-step process. First, a residual image (also known as the error image) is computed by performing a pixel-by-pixel subtraction of the perceived-image intensities from the original-image intensities. Note that the residual image intensities may have both positive and negative values. Secondly, the image-match metric is computed as the overall magnitude of the residual image. The magnitude may be computed as the sum of the absolute values of the residual image or, more optimally, as the energy or root-mean-square of the residual image intensity profile.

Parameter adjustment function 330 adjusts the model parameters to optimize the image match between the perceived and original images. In a preferred embodiment, the parameter adjustment is implemented by a classic regression procedure. The regression procedure consists of two key steps. First, the procedure finds the partial derivatives of the image-match metric with respect to each of the model parameters. One by one, the procedure perturbs a single parameter, creates a perceived image, measures the resulting change in the residual image quality metric, and computes the partial derivative as the change in the quality metric divided by the perturbation in the parameter. Secondly, the procedure estimates the set of parameter corrections based upon a regression of all the partial derivatives.

The intrinsic relationship between the model parameters and the image-match metric is typically highly nonlinear and multi-modal. Thus, when processing an original image, the PIP process typically begins with an initial set of parameter values that is moderately close to the optimum values, and an iterative process through the above three steps is generally required to reach the optimum set of parameter values.

In summary, the PIP algorithm adjusts the model parameters until the perceived image optimally matches the original camera image. After the perceived and original images are matched, the values of the model parameters are interpreted as the 'most intelligent' estimates of the true object parameters.

At any time during the regression procedure, the intensity profile within the residual (error) image consists of two components: true noise in the real image (un-correlated to the perceived object image) and model error between the perceived and original images (correlated to perceived object image).

True noise in many real images is often completely un-correlated to the intrinsic, real object being viewed. Model errors between the perceived and original images, on the other hand, appear as artifacts that are highly correlated to the perceived image. The PIP concept exploits the difference between the correlated and un-correlated components of the residual image to differentiate between image noise (clutter) and model error.

Here, correlations between the perceived and residual images are defined in terms of the partial derivatives between the model parameters and the resulting overall energy in the residual image. If (given the current values for a model parameter set) an incremental change in a model parameter results in a monotonic change in the residual-image energy, a correlation between the perceived and residual image is defined to exist, and the regression function continues to adjust the parameter until the partial derivative (i.e., correlation) vanishes. When the regression function converges to a set of model parameters that produces a minimum residual-image energy, all parameter correlations between the perceived and residual images have vanished. Thus, from a mathematical standpoint, the RMS-intensity minimization eliminates any portion of the residual image that is correlated to the perceived image.

One of PIP's key features is its inherent insensitivity to uncorrelated noise clutter contained in original camera images. An alternative way of viewing PIP's insensitivity to clutter is this: by its mathematical construction, the intensity profile of the perceived image is constrained to take only the shapes of known, idealized object images. (The properties of the object-image components vary, of course, as a function of the perceived-image parameter values, but the component shapes of the object are constrained by the known, idealized model of the eye image.) After PIP minimizes the RMS value of the residual image, the residual image consists entirely of intensity content that cannot be accounted for by an idealized object image—it is original image noise without any correlated model error. Unless the real noise pattern in the original image happens by chance to be correlated to the real object image shape, the residual image may then be interpreted as pure clutter superimposed on the idealized original image.

Figure 4:
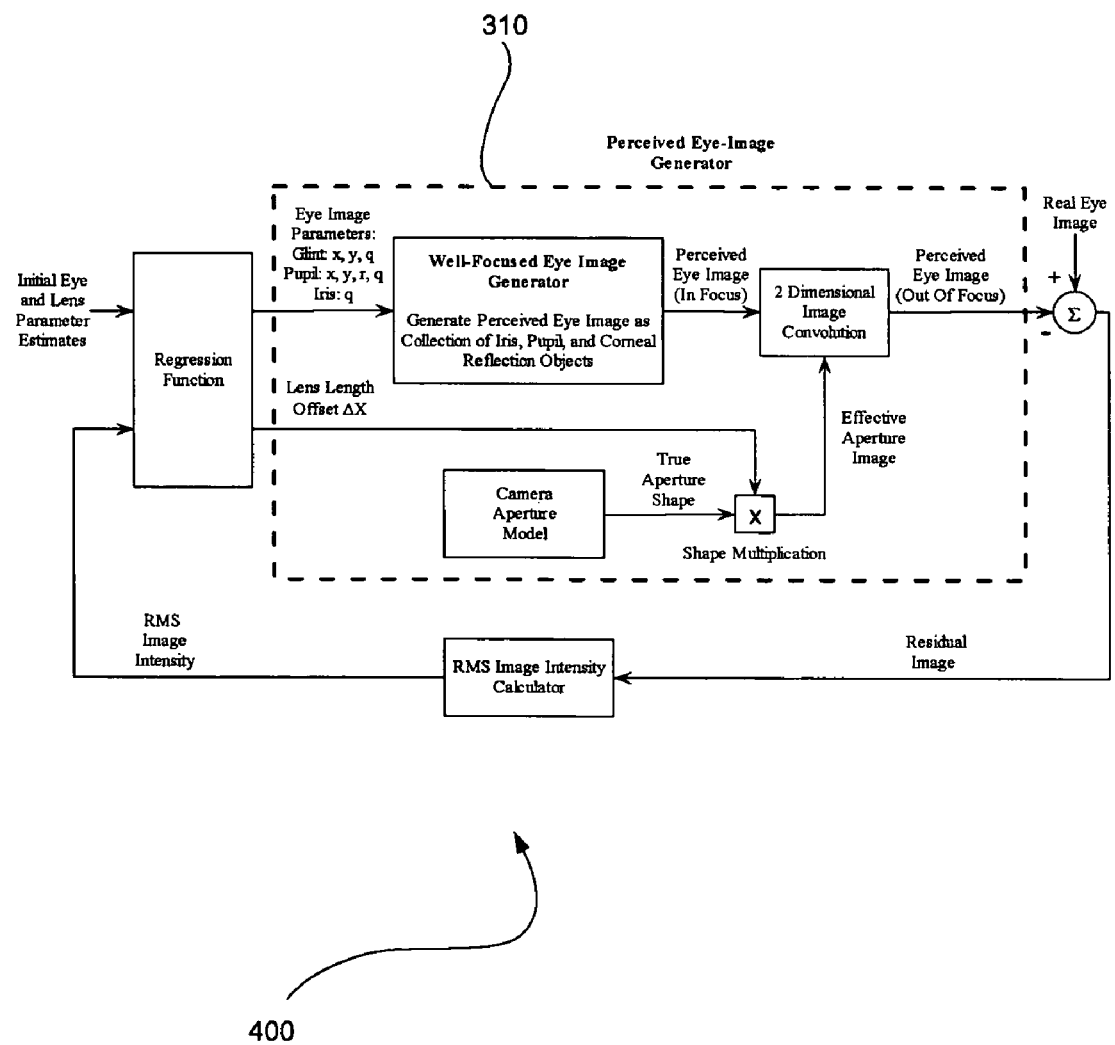
FIG. 4 is a schematic diagram of a perceived image processing system operating in a gaze tracking system, in accordance with an embodiment of the present invention.

FIG. 4 is a schematic diagram of a perceived image processing system 400 operating in a gaze tracking system, in accordance with an embodiment of the present invention.

When measuring an eye in a given camera frame, the gaze tracking system's PIP function uses the parameter outputs of the existing low level image processing software as the initial parameter values for generating the perceived image. Since these values are typically quite accurate to begin with, particularly for low-noise eye images, the PIP algorithm converges to more optimum values in relatively few iterations.

As discussed earlier, the perceived image generator 310 in system 400 preferably accurately models the true physical effects of the object or objects being viewed by the real camera. As the regression procedure adjusts the model parameter values, perceived image generator 310 accurately predicts the image changes that would occur if the same parameter changes were to occur in reality. The following discussion presents an example of the principles used to design perceived image generator 310. In this case, the PIP application is for a video eye tracker.

In video eye trackers, the coordinates of the corneal reflection and the pupil center are the key features of the eye image that are measured to determine the eye's direction of gaze. Thus, to implement the PIP concept in an eye tracker, perceived image generator 310 produces synthetic images that accurately replicate real pupil and corneal-reflection images, and the variable model parameters accurately represent expected variations in the features of these objects. Since the corneal reflection and the pupil both exist within the background of the eye's iris, it is also preferable to model the iris image accurately.

The fundamental characteristics of an eye image captured by an eye tracker are as follows. The iris is typically a disk of uniform brightness. The pupil is a smaller disk located in the middle of the iris, and the pupil, like the iris, also has a typically uniform brightness. The pupil is brighter than the iris if the eye tracker uses bright-pupil illumination, or darker than the pupil if the system uses dark-pupil illumination. If the eye is oriented toward the camera, the iris and pupil are approximately circular. As the gaze axis moves away from the camera, the shapes become elliptical with ever decreasing aspect ratios. Finally, the corneal reflection appears as an impulse superimposed on the iris and/or pupil. This information of what an eye looks like represents the a priori knowledge to be designed into the perceived image generator 310.

Once the characteristic shapes of the eye objects are defined, the second step in the design of Perceived Image Generator is to define a set of variable parameters that account for expected variations in the captured images. In the eye-tracking example, the eye images vary as a function of the position of the eye with respect to the camera, pupil dilation, orientation of the eye, and illumination on the eye.

The perceived eye image is generated based on the following model parameters: the corneal-reflection (glint) coordinates and intensity, the pupil coordinates, diameter and intensity, the iris intensity, and the focus-offset condition of the camera lens.

In the present embodiment, the gaze tracking system uses an asymmetric aperture and exploits this shape information to measure the eye range parameter. An exemplary gaze tracking system is described in U.S. Pat. No. 4,974,010, which is incorporated by reference herein. For the PIP algorithm to further exploit the use of this shape information in the presence of ambient noise, perceived image generator 310 accurately models the shape of the asymmetric aperture and simulates the convolution optics that govern the real image formation in the gaze tracking camera.

FIG. 4 shows the detail of perceived image generator 310 generator for an out-of-focus eye image obtained from a gaze tracking camera with the asymmetric aperture. First a well-focused eye image is generated. An aperture transform function is generated from the known shape of the true aperture and the estimate of the focal offset. The final perceived image is then constructed as the 2-dimensional convolution of the aperture transform and the well-focused image.

Figure 5:
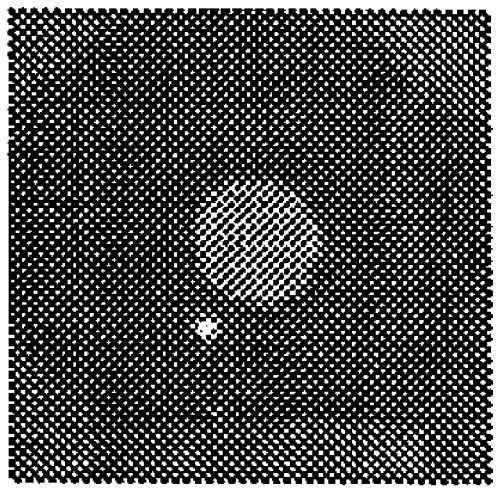
FIG. 5 is an exemplary gray scale real or original eye image obtained from a camera of a gaze tracking system, in accordance with an embodiment of the present invention.
Figure 5:
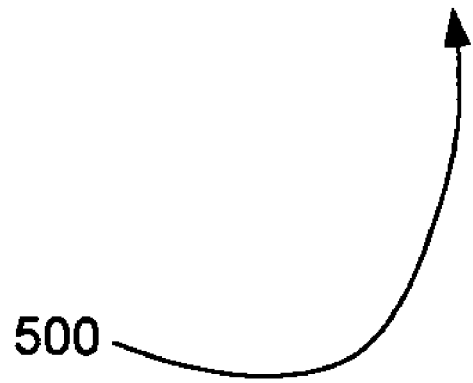

FIG. 5 is an exemplary gray scale real or original eye image 500 obtained from a camera of a gaze tracking system, in accordance with an embodiment of the present invention.

Figure 6:
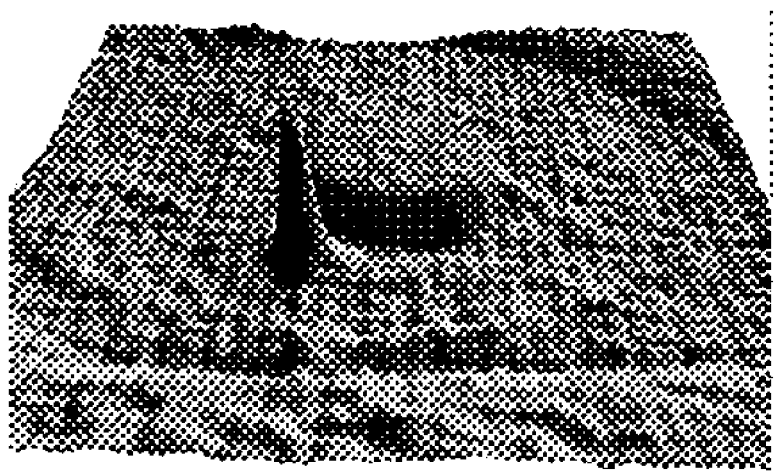
FIG. 6 is an exemplary three-dimensional real or original eye image obtained from a camera of a gaze tracking system, where the vertical dimension corresponds to the image intensity at each pixel, in accordance with an embodiment of the present invention.
Figure 6:
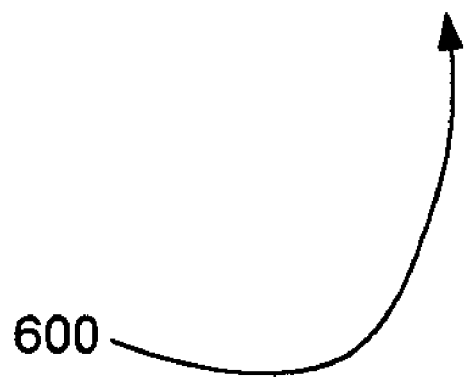

FIG. 6 is an exemplary three-dimensional real or original eye image 600 obtained from a camera of a gaze tracking system, where the vertical dimension corresponds to the image intensity at each pixel, in accordance with an embodiment of the present invention.

Figure 7:
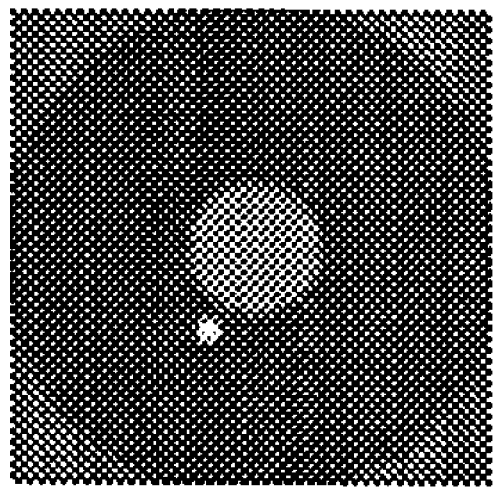
FIG. 7 is an exemplary gray scale initial perceived eye image that is based on an original estimate of eye-image parameters made by image processing software of a gaze tracking system, in accordance with an embodiment of the present invention.
Figure 7:
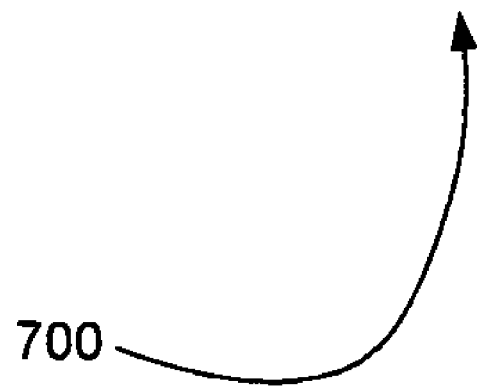

FIG. 7 is an exemplary gray scale initial perceived eye image 700 that is based on an original estimate of eye-image parameters made by image processing software of a gaze tracking system, in accordance with an embodiment of the present invention.

Figure 8:
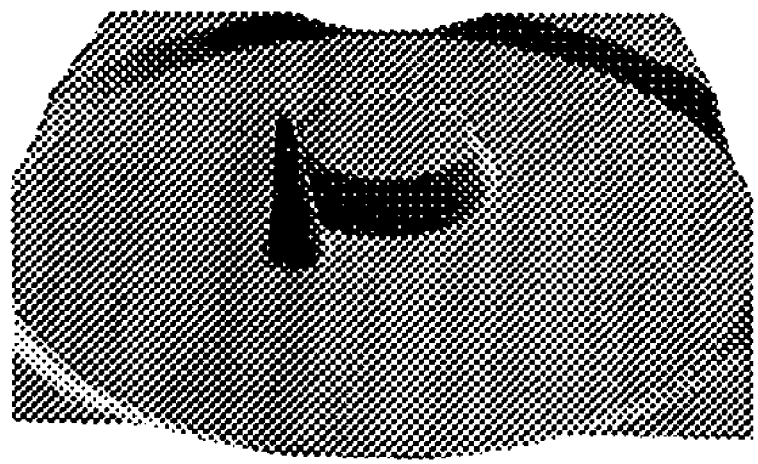
FIG. 8 is an exemplary three-dimensional initial perceived eye image that is based on an original estimate of eye-image parameters made by image processing software of a gaze tracking system, where the vertical dimension corresponds to the image intensity at each pixel, in accordance with an embodiment of the present invention.
Figure 8:
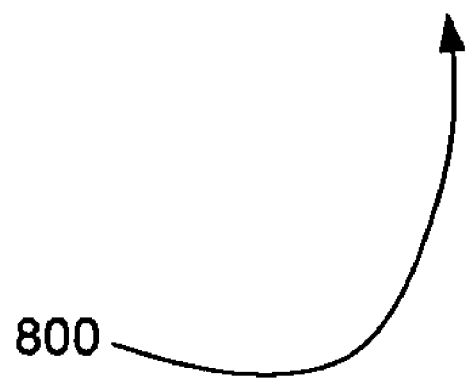

FIG. 8 is an exemplary three-dimensional initial perceived eye image 800 that is based on an original estimate of eye-image parameters made by image processing software of a gaze tracking system, where the vertical dimension corresponds to the image intensity at each pixel, in accordance with an embodiment of the present invention.

Figure 9:
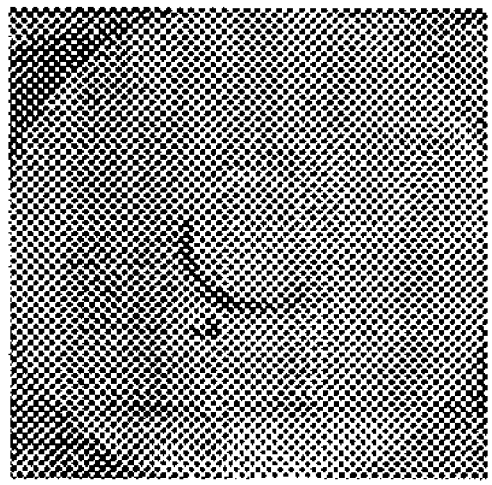
FIG. 9 is an exemplary gray scale initial residual error eye image, in accordance with an embodiment of the present invention.
Figure 9:
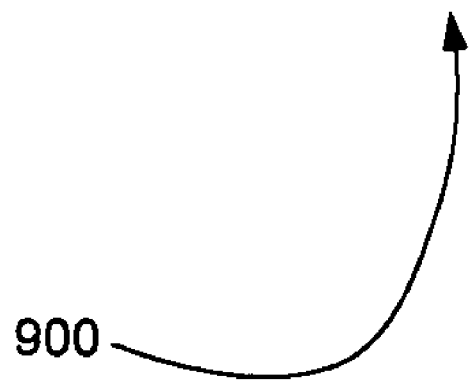

FIG. 9 is an exemplary gray scale initial residual error eye image 900, in accordance with an embodiment of the present invention.

Figure 10:
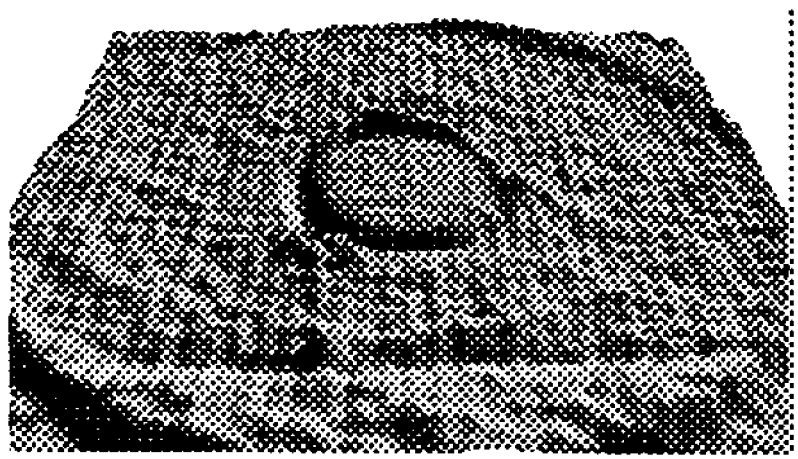
FIG. 10 is an exemplary three-dimensional initial residual error eye image, where the vertical dimension corresponds to the image intensity at each pixel, in accordance with an embodiment of the present invention.
Figure 10:
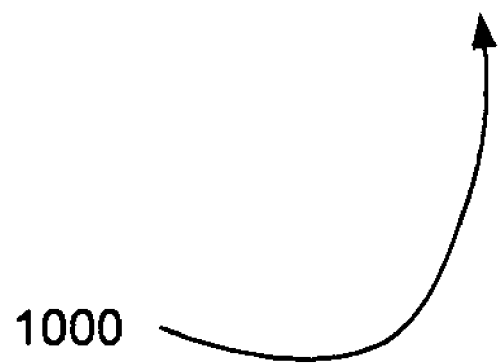

FIG. 10 is an exemplary three-dimensional initial residual error eye image 1000, where the vertical dimension corresponds to the image intensity at each pixel, in accordance with an embodiment of the present invention.

In FIGS. 5-10, the true noise consists primarily of camera sensor noise, which can be recognized as the general ripple patterns in the original and residual images. Since the model's initial pupil parameters are slightly inaccurate, the Residual Image's model errors appear as ridges along the pupil edge. Note that this ridge is clearly correlated with the edge of the pupil, and PIP therefore interprets it as a model error.

Figure 11:
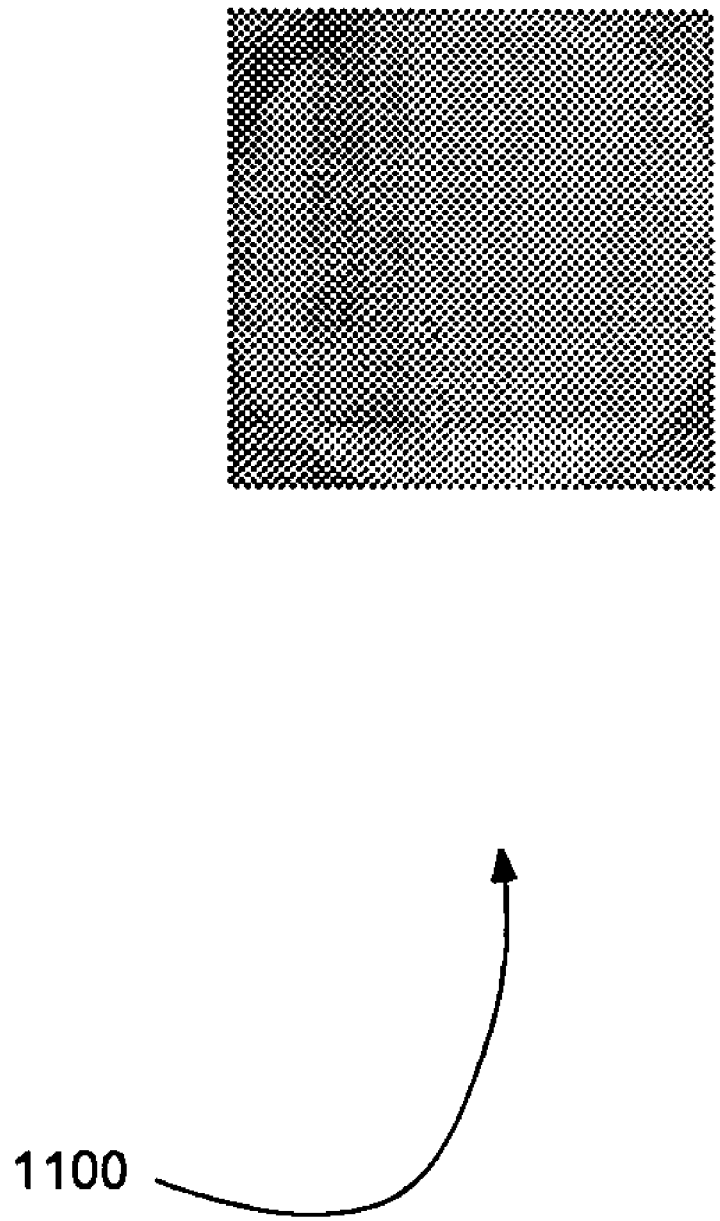
FIG. 11 is an exemplary gray scale residual eye image after the perceived image's pupil location has been corrected by a parameter regression function, in accordance with an embodiment of the present invention.

FIG. 11 is an exemplary gray scale residual eye image 1100 after the perceived image's pupil location has been corrected by a parameter regression function, in accordance with an embodiment of the present invention.

Figure 12:
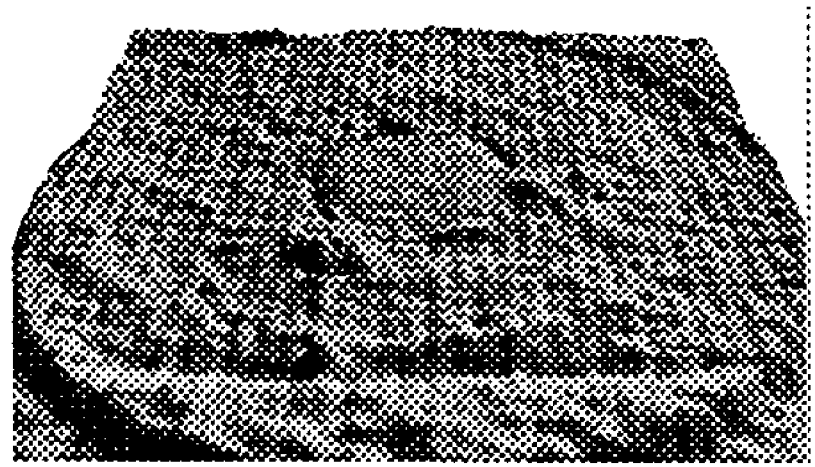
FIG. 12 is an exemplary three-dimensional residual eye image after the perceived image's pupil location has been corrected by a parameter regression function, where the vertical dimension corresponds to the image intensity at each pixel, in accordance with an embodiment of the present invention.
Figure 12:
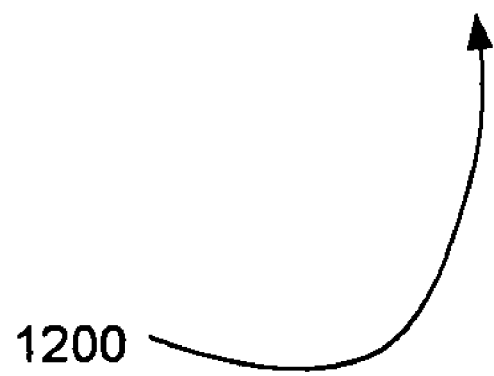

FIG. 12 is an exemplary three-dimensional residual eye image 1200 after the perceived image's pupil location has been corrected by a parameter regression function, where the vertical dimension corresponds to the image intensity at each pixel, in accordance with an embodiment of the present invention. As the pupil location is corrected, the RMS error of the residual image decreases, and the ridges at the edges of the pupil are minimized accordingly.

The eye images in FIGS. 5-12 illustrate the effect of PIP in optimizing pupil parameters. In another embodiment of the present invention PIP is used to optimize focus parameters. PIP can improve the measurement of the focus-range offset for an eye image, where the camera is slightly out of focus.

Figure 13:
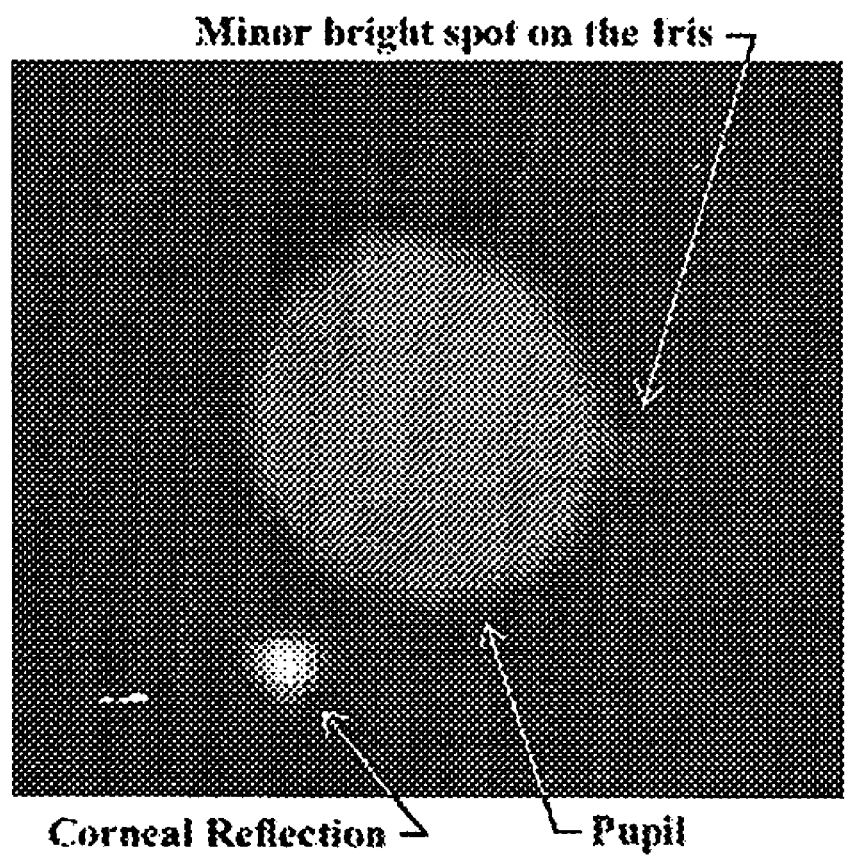
FIG. 13 is an exemplary gray scale real or original eye image obtained from a camera of a gaze tracking system, where the camera is slightly out of focus, in accordance with an embodiment of the present invention.

FIG. 13 is an exemplary gray scale real or original eye image 1300 obtained from a camera of a gaze tracking system, where the camera is slightly out of focus, in accordance with an embodiment of the present invention.

Figure 14:
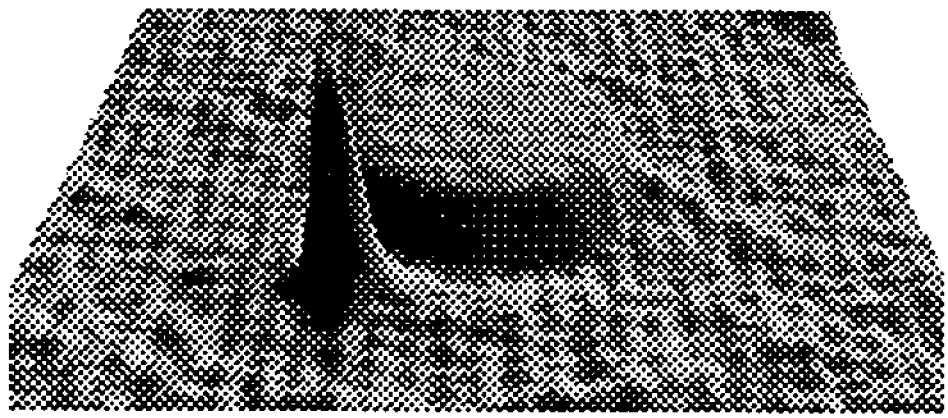
FIG. 14 is an exemplary three-dimensional real or original eye image obtained from a camera of a gaze tracking system, where the vertical dimension corresponds to the image intensity at each pixel and where the camera is slightly out of focus, in accordance with an embodiment of the present invention.
Figure 14:
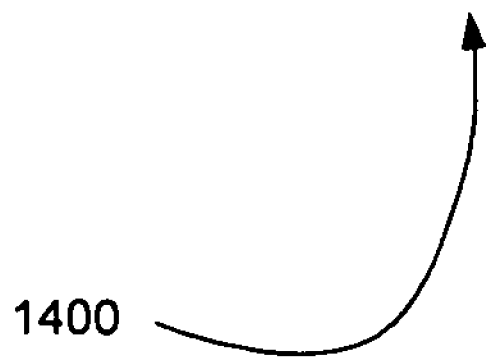

FIG. 14 is an exemplary three-dimensional real or original eye image 1400 obtained from a camera of a gaze tracking system, where the vertical dimension corresponds to the image intensity at each pixel and where the camera is slightly out of focus, in accordance with an embodiment of the present invention.

Figure 15:
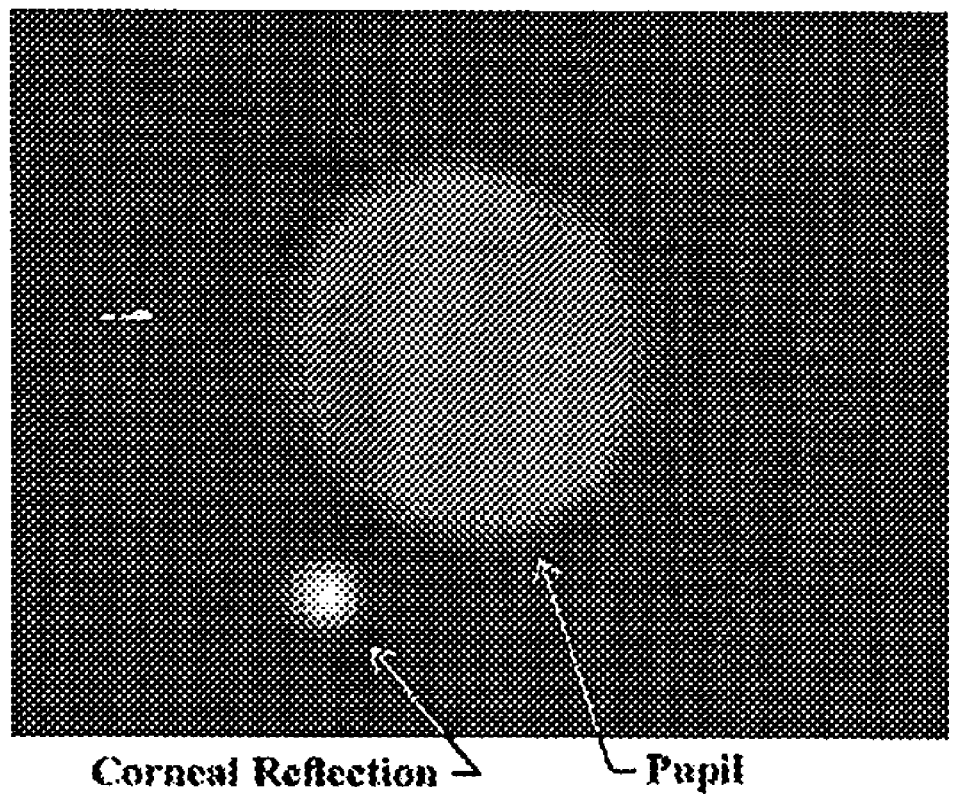
FIG. 15 is an exemplary gray scale initial perceived eye image that is based on an original estimate of eye-image parameters made by image processing software of a gaze tracking system, where the camera is slightly out of focus, in accordance with an embodiment of the present invention.

FIG. 15 is an exemplary gray scale initial perceived eye image 1500 that is based on an original estimate of eye-image parameters made by image processing software of a gaze tracking system, where the camera is slightly out of focus, in accordance with an embodiment of the present invention.

Figure 16:
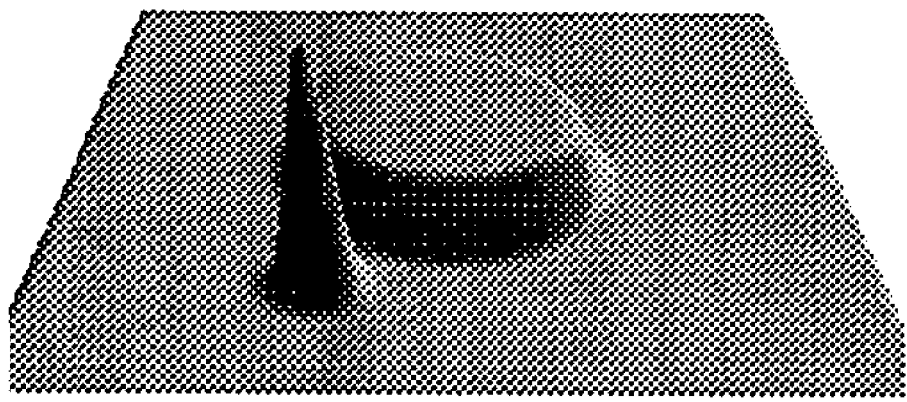
FIG. 16 is an exemplary three-dimensional initial perceived eye image that is based on an original estimate of eye-image parameters made by image processing software of a gaze tracking system, where the vertical dimension corresponds to the image intensity at each pixel and where the camera is slightly out of focus, in accordance with an embodiment of the present invention.
Figure 16:
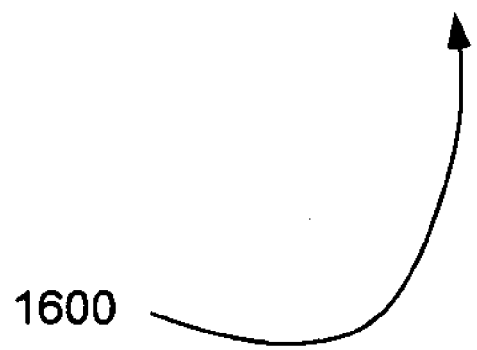

FIG. 16 is an exemplary three-dimensional initial perceived eye image 1600 that is based on an original estimate of eye-image parameters made by image processing software of a gaze tracking system, where the vertical dimension corresponds to the image intensity at each pixel and where the camera is slightly out of focus, in accordance with an embodiment of the present invention.

Figure 17:
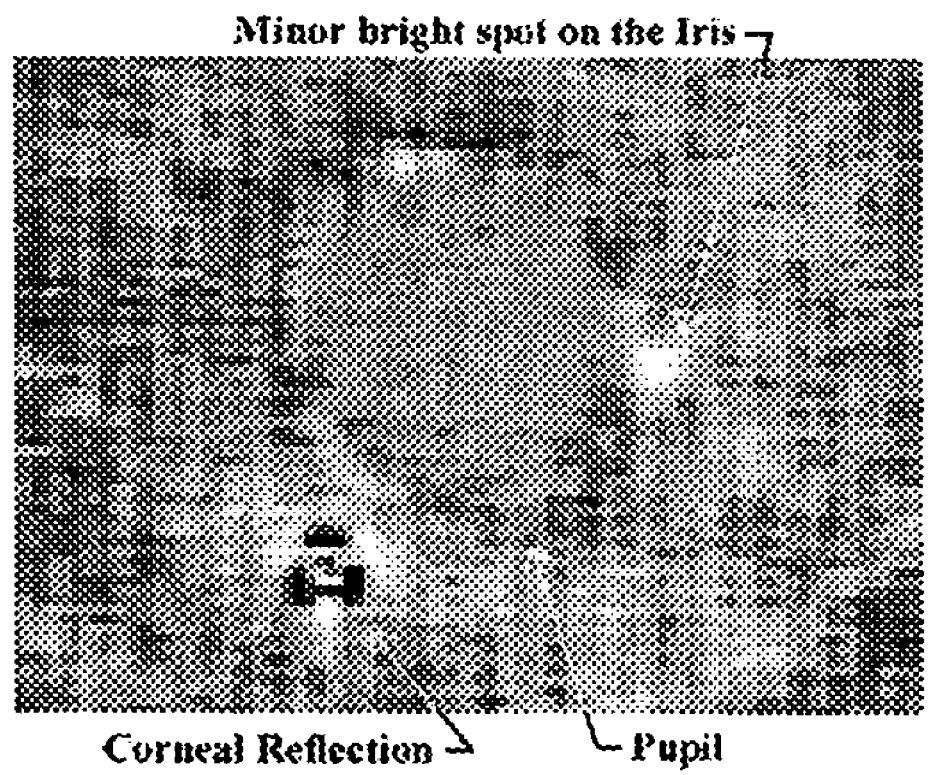
FIG. 17 is an exemplary gray scale residual eye image after the perceived image's pupil location has been corrected by a parameter regression function, where the camera is slightly out of focus, in accordance with an embodiment of the present invention.
Figure 17:
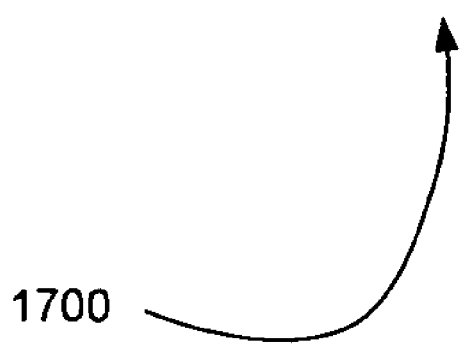

FIG. 17 is an exemplary gray scale residual eye image 1700 after the perceived image's pupil location has been corrected by a parameter regression function, where the camera is slightly out of focus, in accordance with an embodiment of the present invention.

Figure 18:
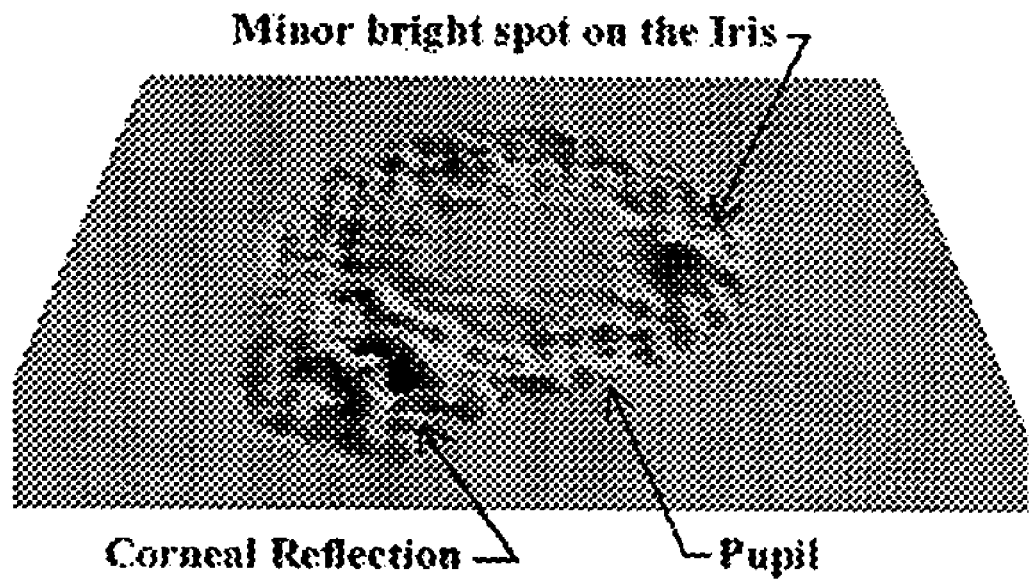
FIG. 18 is an exemplary three-dimensional residual eye image after the perceived image's pupil location has been corrected by a parameter regression function, where the vertical dimension corresponds to the image intensity at each pixel and where the camera is slightly out of focus, in accordance with an embodiment of the present invention.
Figure 18:
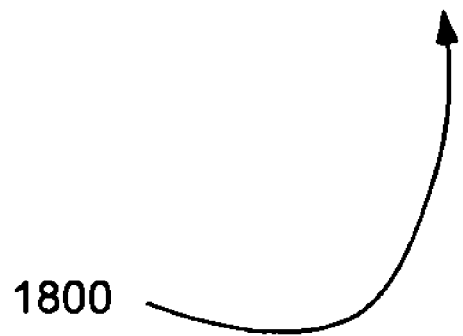

FIG. 18 is an exemplary three-dimensional residual eye image 1800 after the perceived image's pupil location has been corrected by a parameter regression function, where the vertical dimension corresponds to the image intensity at each pixel and where the camera is slightly out of focus, in accordance with an embodiment of the present invention.

Figure 19:
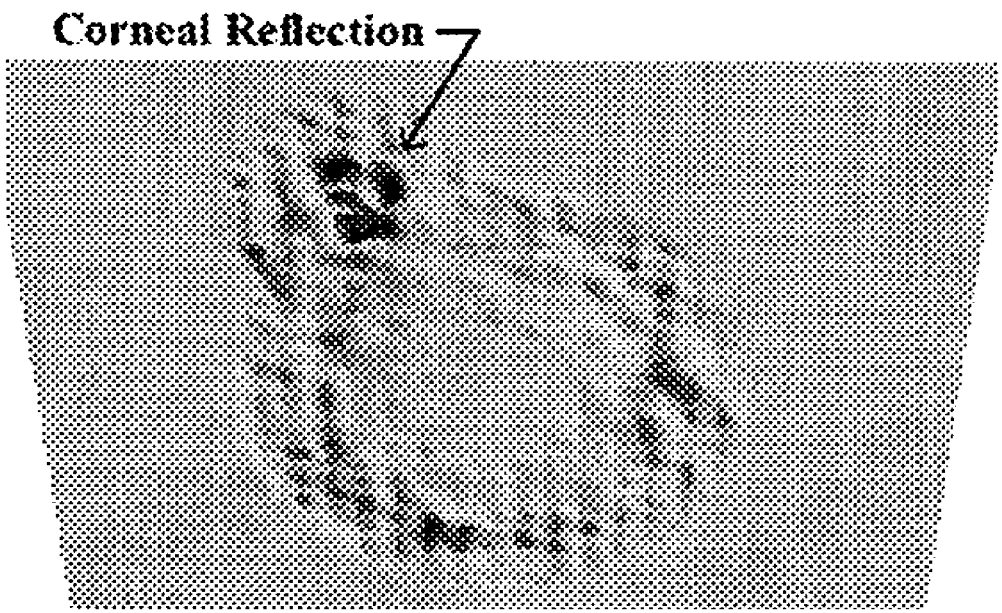
FIG. 19 is an exemplary three-dimensional residual eye image after the perceived image's pupil location has been corrected by a parameter regression function viewed from the bottom, where the vertical dimension corresponds to the image intensity at each pixel and where the camera is slightly out of focus, in accordance with an embodiment of the present invention.

FIG. 19 is an exemplary three-dimensional residual eye image 1900 after the perceived image's pupil location has been corrected by a parameter regression function viewed from the bottom, where the vertical dimension corresponds to the image intensity at each pixel and where the camera is slightly out of focus, in accordance with an embodiment of the present invention.

Figure 20:
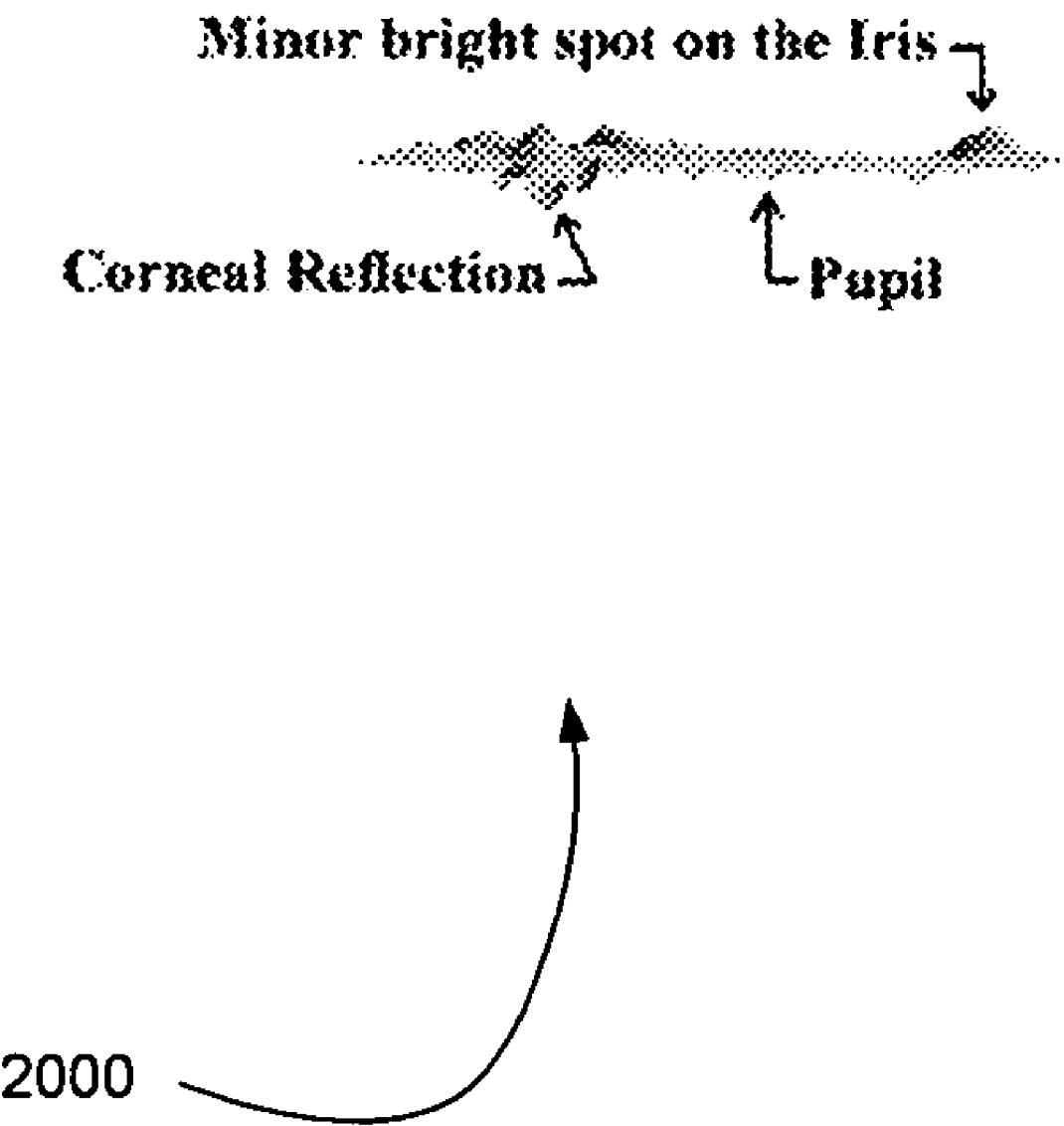
FIG. 20 is an exemplary three-dimensional residual eye image after the perceived image's pupil location has been corrected by a parameter regression function viewed from the side, where the vertical dimension corresponds to the image intensity at each pixel and where the camera is slightly out of focus, in accordance with an embodiment of the present invention.

FIG. 20 is an exemplary three-dimensional residual eye image 2000 after the perceived image's pupil location has been corrected by a parameter regression function viewed from the side, where the vertical dimension corresponds to the image intensity at each pixel and where the camera is slightly out of focus, in accordance with an embodiment of the present invention.

FIGS. 19 and 20 show different views of the residual image to visually emphasize its information content. FIG. 19 shows a view of the residual from the bottom, which highlights the triangular aperture pattern. FIG. 20 shows the residual image from the side to show the magnitude of the errors.

As mentioned above, the residual image around the corneal reflection takes the shape of a distinctive triangle of an asymmetric camera aperture. This correlation between the residual image pattern and the known aperture shape indicates that, although the original image appears to be in pretty good focus, there is significant focus-depth information in the original corneal reflection image. The perceived image generator synthesizes the corneal reflection portion of the perceived image in accordance with the modeled focus-offset parameter, and PIP regresses the parameter value to optimally match the shape of the perceive image to the original image. Thus the PIP algorithm successfully enhances and extracts this focus-range-offset information.

While the Perceived Image Processing procedure is quite effective at optimizing eye-model parameters, PIP is relatively insensitive to true noise (clutter) in the eye image. For example, the bright spot at the right edge of the pupil in FIG. 13 is the reflection from an ambient light source. While the spot does adversely effect the eye image processing's original pupil-center and pupil-radius estimates (the spot biased the right edge cuts through the spot to estimate the pupil edge to be further to the right than it really is, causing the eye image processing's elliptical fit to be biased to the right), the spot does not induce a corresponding bias in PIP's final pupil-parameter estimates. Since the image's RMS error contributions from the spot are not correlated to changes in the eye model's pupil parameters, the spot does not bias PIP's regression process.

Generating perceived images can be a CPU intensive task. However modern graphics chips render parametric models very quickly and can be applied to the problem. Also, many of the time-consuming computations could be run in custom ASIC chips.

Figure 21:
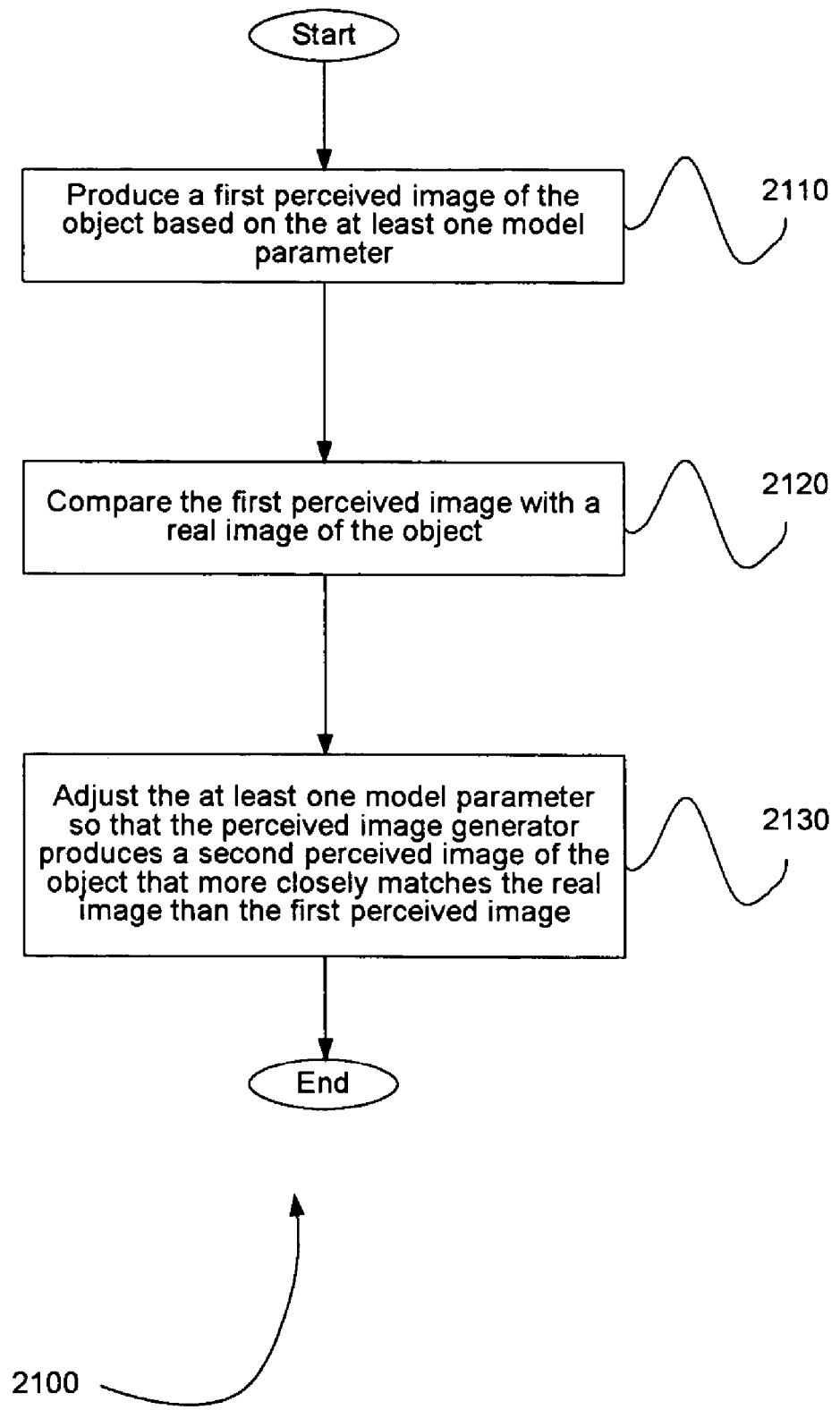
FIG. 21 is a flowchart showing an exemplary method for measuring and modifying at least one parameter of an object of an image in order to distinguish the object from noise in the image, in accordance with an embodiment of the present invention.

FIG. 21 is a flowchart showing an exemplary method 2100 for measuring and modifying at least one parameter of an object of an image in order to distinguish the object from noise in the image, in accordance with an embodiment of the present invention.

In step 2110 of method 2100, a first perceived image of the object is produced based on the at least one model parameter.

In step 2120, the first perceived image is compared with a real image of the object.

In step 2130, the at least one model parameter is adjusted so that the perceived image generator produces a second perceived image of the object that more closely matches the real image than the first perceived image.

Further examples of the present invention are as follows:

A first example is an apparatus including a gaze tracking system, a means for generating a synthetic image of a scene, and a means for measuring a difference between the synthetic image and the real image.

A second example is an apparatus that is substantially similar to the first example and includes using the measured difference to adjust the output of the gaze tracking system.

A third example is an apparatus that is substantially similar to the second example and includes using a pixel by pixel RMS measurement of the difference measurement.

A fourth example is a method for pattern recognition including creating parametric model, converting said model into a synthetic image, comparing said image with a real image, and adjusting the parameters in the parametric model based on the output of comparing said image with a real image.

A fifth example is a method or apparatus to measure parameters of one or more objects in an original image including a perceived-image generator that generates a synthetic image based on a set of variable model parameters, an image-comparison means that computes an image-match measure indicative of how well the perceived image matches the original image, and a parameter-adjustment means that adjusts the model parameters to optimize the image match between the perceived and original images.

A sixth example is a method or apparatus that is substantially similar to the fifth example in which the perceived-image generator synthesizes the perceived image based on a priori knowledge of physical and optical properties of the real object or objects viewed in the image and a set of adjustable parameters that represent the variable features of the object or objects being viewed.

A seventh example is method or apparatus to measure parameters of one or more objects in an original image including a perceived-image generator that generates a synthetic image based on a set of variable model parameters, and an image-comparison means that computes an image-match measure indicative of how well the perceived image matches the original image, a parameter-adjustment means that adjusts the model parameters to optimize the image match between the perceived and original images, in which the image comparison is performed by a pixel-by-pixel subtraction of the perceived-image intensities from the original-image intensities to form a residual image, where the residual-image intensities may have both positive and negative values, and magnitude-calculation means that compute the image-match measure as the overall magnitude of the residual image.

An eighth example is a method or apparatus that is substantially similar to the seventh example in which the magnitude of the residual image is calculated as the energy or root-mean-square of the residual-image intensity profile.

A ninth example is a method or apparatus to measure parameters of one or more objects in an original image including a perceived-image generator that generates a synthetic image based on a set of variable model parameters, and an image-comparison means that computes an image-match measure indicative of how well the perceived image matches the original image, a parameter-adjustment means that adjusts the model parameters to optimize the image match between the perceived and original images, in which the parameter-adjustment means include means to find partial derivatives of the residual-image magnitude with respect to parameter perturbations, and estimate parameter corrections based upon a regression of the partial derivatives.

A tenth example is a method or apparatus that is substantially similar examples 1-9 in which the object being viewed is an eye and the parameters being measured include the locations of the pupil and/or corneal-reflection.

An eleventh example is a method or apparatus that is substantially similar to the eleventh example where the original image being processed was captured by a camera with an asymmetric aperture, the parameters being measured include the focus condition of the image, and the focus condition of the perceived eye image is synthesized by convolving an in-focus image with the effective image of the asymmetric aperture.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A system for measuring and modifying at least one model parameter of an object of an image in order to distinguish the object from noise in the image, comprising:

a perceived image generator, wherein the perceived image generator produces a first perceived image of the object based on a priori knowledge of one or more physical and/or optical properties of the object and the at least one model parameter that represents a measurement of at least one of the one or more physical and/or optical properties of the object;

an image-match function, wherein the image-match function compares the first perceived image with a real image of the object; and a parameter adjustment function, wherein the parameter adjustment function adjusts the at least one model parameter so that the perceived image generator produces a second perceived image of the object that more closely matches the real image than the first perceived image.

2. A method for measuring and modifying at least one model parameter of an object of an image in order to distinguish the object from noise in the image, comprising:

producing a first perceived image of the object based on a priori knowledge of one or more physical and/or optical properties of the object and the at least one model parameter that represents a measurement of at least one of the one or more physical and/or optical properties of the object;

comparing the first perceived image with a real image of the object; and adjusting the at least one model parameter so that the perceived image generator produces a second perceived image of the object that more closely matches the real image than the first perceived image.

3. The system of claim 1, wherein the image-match function performs a pixel-by-pixel subtraction means to subtract intensities of pixels of the perceived-image from intensities of pixels of the real image to form a residual image, wherein the residual image pixels intensities have both positive and negative values, and computes an image-match metric as an overall magnitude of the residual image.

4. The system of claim 3, wherein the image-match metric is computed as a sum of absolute values of the residual image.

5. The system of claim 3, wherein the image-match metric is computed as an energy or root-mean-square of the residual image intensity profile.

6. The system of claim 3, wherein the parameter adjustment means finds partial derivatives of the residual image magnitude image-match metric with respect to the at least one model parameter, and estimates a set of parameter corrections based upon a regression of the partial derivatives.

7. The system of claim 1, wherein the object comprises an eye.

8. The system of claim 7, wherein the one or more physical and/or optical properties of the object comprise a pupil of the eye.

9. The system of claim 7, wherein the one or more physical and/or optical properties of the object comprise a corneal reflection from the eye.

10. The system of claim 1, wherein
the real image is captured by a camera with an asymmetric aperture as an out-of-focus image,
a well-focused image is generated using the at least one model parameter comprising a focus condition of the real image, and
the perceived image is constructed as a convolution of an aperture transform and the well-focused image.

11. The method of claim 2, wherein comparing the first perceived image with a real image of the object comprises performing a pixel-by-pixel subtraction means to subtract intensities of pixels of the perceived-image from intensities of pixels of the real image to form a residual image, wherein the residual image pixels intensities have both positive and negative values, and computing an image-match metric as an overall magnitude of the residual image.

12. The method of claim 11, wherein the image-match metric is computed as a sum of absolute values of the residual image.

13. The method of claim 11, wherein the image-match metric is computed as an energy or root-mean-square of the residual image intensity profile.

14. The method of claim 11, wherein adjusting the at least one model parameter comprises finding partial derivatives of the residual image magnitude image-match metric with respect to the at least one model parameter, and estimating a set of parameter corrections based upon a regression of the partial derivatives.

15. The method of claim 2, wherein the object comprises an eye.

16. The method of claim 15, wherein the one or more physical and/or optical properties of the object comprise a pupil of the eye.

17. The method of claim 15, wherein the one or more physical and/or optical properties of the object comprise a corneal reflection from the eye.

18. The method of claim 2, wherein
the real image is captured by a camera with an asymmetric aperture as an out-of-focus image,
a well-focused image is generated using the at least one model parameter comprising a focus condition of the real image, and
the perceived image is constructed as a convolution of an aperture transform and the well-focused image.

19. The method of claim 2, wherein the at least one model parameter comprises one of corneal-reflection (glint) coordinates, corneal-reflection intensity, pupil coordinates, pupil diameter, pupil intensity, or iris intensity.

20. The method of claim 2, wherein the at least one model parameter comprises a focus-offset condition of a camera lens.

* * * * *